US008803465B1

(12) United States Patent
Smith et al.

(10) Patent No.: US 8,803,465 B1
(45) Date of Patent: Aug. 12, 2014

(54) FREQUENCY-SELECTIVE COMMAND PROFILE MOTION CONTROL

(75) Inventors: David A. Smith, Rochester, NY (US); Patrick J. Argento, Rochester, NY (US)

(73) Assignee: Exelis Inc., McLean, VA (US)

( * ) Notice: Subject to any disclaimer, the term of this patent is extended or adjusted under 35 U.S.C. 154(b) by 123 days.

(21) Appl. No.: 13/441,450

(22) Filed: Apr. 6, 2012

(51) Int. Cl.
  *G05B 19/25* (2006.01)
(52) U.S. Cl.
  USPC ........... 318/570; 318/573; 700/187; 700/280; 700/188; 700/189
(58) Field of Classification Search
  USPC .......... 318/570, 573; 700/280, 187, 188, 189, 700/44, 45
  See application file for complete search history.

(56) References Cited

U.S. PATENT DOCUMENTS

| 4,195,265 A | 3/1980 | Vali |
| 4,287,460 A | 9/1981 | Nozawa et al. |
| 5,057,756 A | 10/1991 | Hara |
| 5,331,264 A | 7/1994 | Cheng et al. |
| 5,594,309 A | 1/1997 | McConnell et al. |
| 5,627,440 A | 5/1997 | Yamamoto et al. |
| 6,320,345 B1 | 11/2001 | Yuan et al. |
| 6,507,165 B2 | 1/2003 | Kato et al. |
| 7,208,901 B2 * | 4/2007 | Ladra et al. ................... 318/600 |
| 7,341,822 B2 * | 3/2008 | Van Der Sande ............. 430/311 |
| 7,437,201 B2 * | 10/2008 | Cullen ............................ 700/29 |
| 7,613,540 B2 * | 11/2009 | Testa ............................ 700/187 |

* cited by examiner

*Primary Examiner* — Eduardo Colon Santana
*Assistant Examiner* — Bickey Dhakal
(74) *Attorney, Agent, or Firm* — Edell, Shapiro & Finnan, LLC

(57) ABSTRACT

A motion command is constructed based on an optimized acceleration pulse designed to control the spectral content of the commanded acceleration. By way of judicious design of the pulse shape, the majority of the energy in the command is contained in a narrow baseband and rolls off rapidly in frequencies outside that band. Additionally, the command can be constructed to suppress selected frequency content in one or more attenuation bands outside the baseband. The resulting motion command permits rapid motion control, while avoiding the excitation of unwanted resonant response in the system while remaining tolerant of system uncertainty.

25 Claims, 14 Drawing Sheets

FIG.11B FINAL CONFIGURATION

FIG.11A INITIAL CONFIGURATION

FREQUENCY-SELECTIVE COMMAND PROFILE MOTION CONTROL

GOVERNMENT LICENSE RIGHTS

This invention was made with the support of the U.S. Government, and the U.S. Government has certain rights in the invention.

BACKGROUND

Drive signals, such as motor drive signals, can excite undesirable vibrational responses in the systems to which they are applied, such as servomechanisms and servomotors. Such vibrational responses are often the limiting factor in motion control designs, especially when attempting to obtain rapid actuation. Conventional methods for generating motion commands, from which the drive signals are generated, attempt to avoid exciting large vibrational response in mechanical systems in a number of ways. One common approach is to constrain the command formulation in the time-domain to produce a "smooth" command profile that limits the bandwidth of the acceleration spectrum. These methods often employ piecewise differentiable functions that have continuous derivatives up to a specified order. By limiting the magnitude of the derivatives, the bandwidth of the acceleration command is typically reduced.

Another common method of command generation relies on timing the motion duration to match the natural vibration period of the most sensitive mode. For commands where the initial and final velocities are sufficiently close, the acceleration signal will have odd symmetry about the midpoint of the command. The resulting motion command will then excite the vibration mode during the first half of the command and then remove vibrational energy during the second half of the command.

A third category of motion command creation relies on filtering to constrain the acceleration spectrum of a command signal. One particular variation of this approach employs a notch filter to remove frequency content from the command that would otherwise excite a system resonance and result in unwanted vibration.

While most of the traditional approaches have been shown to be beneficial at reducing unwanted vibration, there are limitations to each of these methods. None of these techniques strikes a good balance between minimizing the time required to execute the motion, controlling the spectral content of the commanded acceleration, and maintaining robustness to frequency variations in the response vibration mode. The approach of formulating smooth commands in the time domain does not tightly control the spectral content of the commanded acceleration. Such results in motion having excessive energy at critical frequencies or which takes too long to execute. The technique of timing the slew duration to match the dominant vibration period can be highly effective. But this method is not very robust to even small uncertainty in the vibration period or to shifts in the resonant frequency of vibrational modes. Moreover, this approach breaks down or becomes algorithmically much more complicated if the velocities at the beginning and end of the command are dissimilar to the point of losing predominately odd symmetry in the acceleration signal. The command filtering approach can effectively remove unwanted frequency content from the command, but the commanded duration will be lengthened by the transient response of the filter. This translates to a motion command that requires significantly more time to execute than originally intended.

In light of the shortcomings of these and other techniques, the need has been felt for motion control that balances well motion execution time, the spectral content of the driving signal, and robustness to frequency variations in the system response.

SUMMARY

Described herein is a control technique applicable to motion control, among other applications, that strikes the aforementioned balance. Data are generated to define the acceleration of a mechanical system, such as a servo system. The data are derived from a prototype pulse having a prototypical pulse width and a prototypical pulse shape that define at least one attenuation band in a frequency spectrum of the prototype pulse. The attenuation band is established so as to inhibit an undesired response in the mechanical system due to the commanded acceleration. The amplitude of the prototype pulse is scaled in accordance with initial and final boundary conditions on the state of the mechanical system and the acceleration command is generated in accordance with the scaled prototype pulse such that the change in the state of the mechanical system occurs in a selected time interval.

The above and still further features and advantages of the present inventive concept will become apparent upon consideration of the following definitions, descriptions and descriptive figures of specific embodiments thereof. While these descriptions go into specific details of certain embodiments of the inventive concept, it is to be understood that variations may and do exist and will be apparent to those skilled in the art upon review of this disclosure.

DETAILED DESCRIPTION

Figure 1:
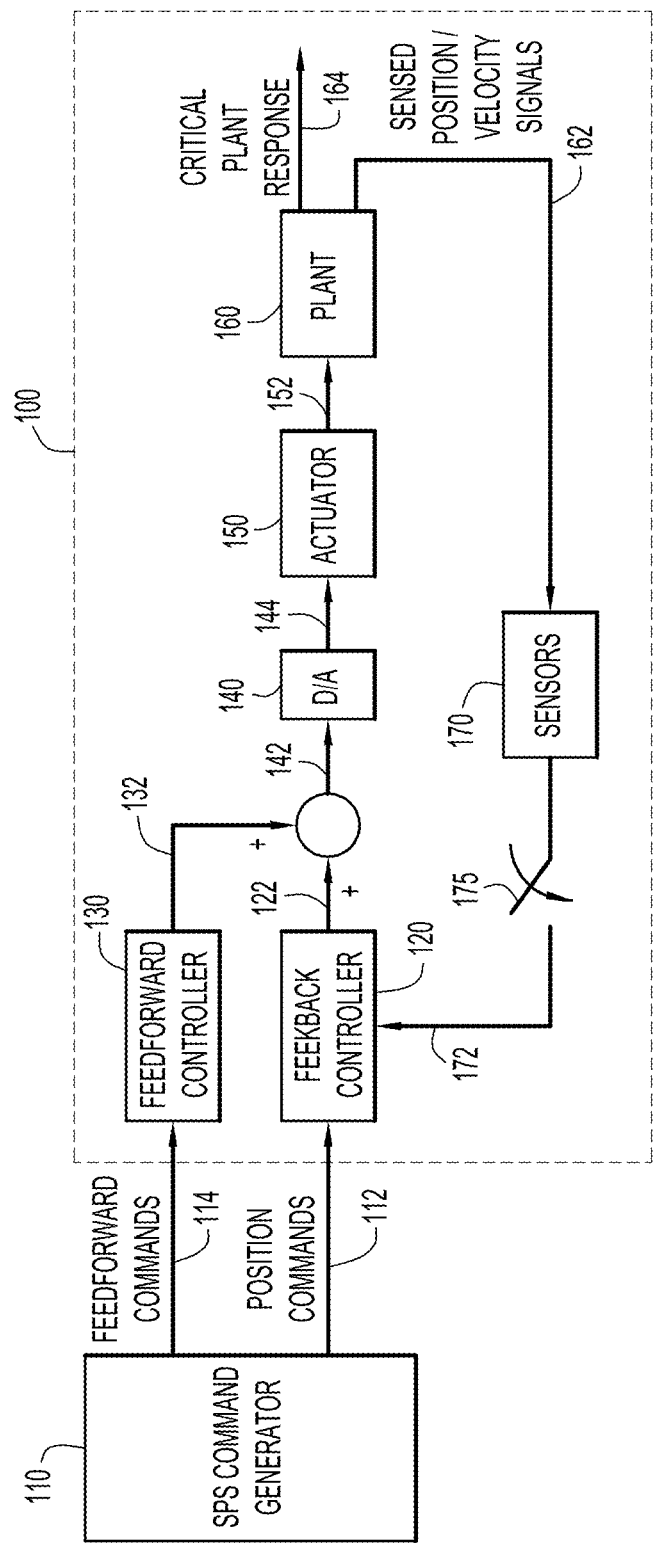
FIG. 1 is a schematic block diagram of an exemplary servosystem in which the present general inventive concept may be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is the intended, the ordinarily skilled artisan will recognize numerous techniques to carry out physical manifestations of the principles being mathematically expressed.

Motion control, as used herein, provides means by which a mechanical system changes state in response to a command signal. The disclosed technique for motion control is based in forming a motion command that is fundamentally developed and characterized in the frequency domain in a manner that shapes the spectral content of the commanded motion profile. The formulation concentrates most of the energy in the command to a fixed baseband bandwidth and then rolls the energy off rapidly beyond that bandwidth. Additionally, the command can be constructed to suppress selected frequency components in one or more attenuation bands outside the baseband. The result is a very efficient command signal that permits rapid motion control without exciting unwanted mechanical vibration or other resonant response in the system while remaining tolerant of system uncertainty.

The embodiment described herein is that of a servomechanism under control of a motion command controller. FIG. 1 illustrates an exemplary servo-system 100, which serves to provide a typical context by which underlying concepts of the invention can be explained. It is to be understood that the servo-system implementation described below is not intended to limit the scope of the invention. Servo-system 100 includes an actuator device 150 and a combined digital-to-analog (D/A) and power amplifier 140 that, responsive to a drive signal 142, applies a force to a dynamic plant 160 through which a change in state thereof is compelled. In this context, actuator force, representatively illustrated at 152, is used in the general sense to include actuators that produce a moment or torque output. Plant 160 has two types of outputs. One output consists of signals 162 that are sensed by the feedback sensors 170. The other outputs are not measured by feedback sensors, but represent critical response outputs 164 that result from the actuator forces 152. Critical response outputs 164 may be sensitive to one or more system resonances that can be excited by the actuator forces 152. Actuator device 150 may be constructed to motivate the plant 160 through multiple spatial dimensions, e.g., linearly, rotationally, or various combinations thereof, in response to a physical flow of electric current 144. It is to be understood that the present invention is not limited to a particular directional mode in which actuator device 150 operates. However, for purposes of explanation, it is to be assumed that actuator device 150 operates to rotate plant 160 in accordance with a command signal 142. The ordinarily skilled artisan will readily recognize functional analogs by which non-rotational systems can embody the present invention without deviating from the spirit and intended scope thereof.

Exemplary actuator device 150 may be selected from a wide variety of devices, but for purposes of description and not limitation, it is to be assumed that actuator device is a direct current (DC) electric motor. Feedback information is derived from one or more sensors 170, such as a rotary encoder to indicate angular position and a tachometer to indicate angular velocity. The feedback signals are processed by the feedback controller 120 to generate signal 122 which comprises a portion of the actuator drive signal 142. The present invention is not limited to particular actuator or position sensor types, and such will vary on an application basis. The angular position and velocity of actuator 150 is provided by sensors 170 mechanically coupled to actuator 150 or, alternatively, by a kinematically coupled mechanical displacement within plant 160. Sensors 170 may produce electrical signals that may be suitably sampled, representatively illustrated at sampler 175, and provided to feedback controller 120 as signals 172 to complete the feedback loop. Additionally, a feedforward command 132 may apply a command to the actuator that is based on a model of the actuator/plant response. The feedforward command can significantly extend the servomechanism response bandwidth beyond the closed loop bandwidth of the feedback control system and therefore can potentially excite higher frequency system resonances.

The term slew will be used herein to connote a rotational trajectory, where the term trajectory is used generically herein as a controlled path of motion in any direction. Servomechanism 100 is thus slewed by a slew command issued by the Shaped Pulse Slew (SPS) command generator 110. A slew command, as used herein, is a digital or analog signal according to which the slew is carried out, which, in the present case, is implemented by position command signal 112 and feedforward command signals 114. In the presently described exemplary embodiment, a slew command is parameterized by a set of command signals: a position signal $\theta$, a velocity signal $\omega$ and an acceleration signal $\alpha$. It is to be understood that such parameterization is used herein solely for purposes of explanation; the present invention can be carried out in numerous control processing models. In the present exemplary model, the command variables are updated at regular intervals and used to form the position command signal 112 and the feedforward command signals 114.

Figure 2:
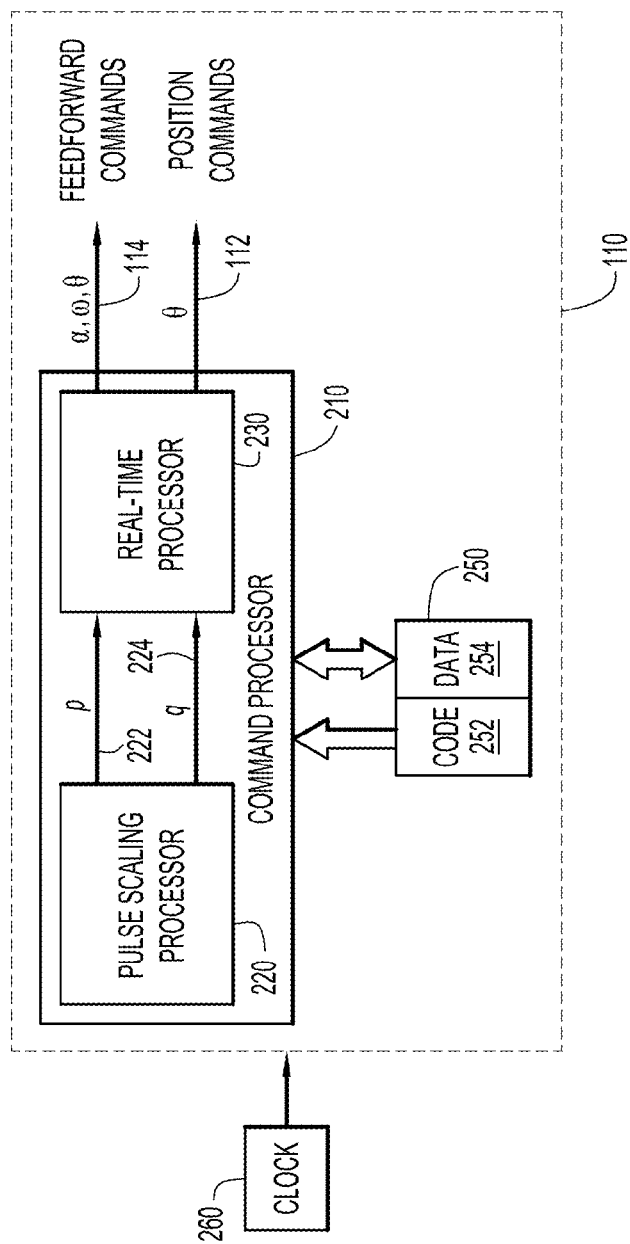
FIG. 2 is a schematic block diagram of an exemplary command generator in which the present general inventive concept may be embodied.

An exemplary SPS command generator 110 is illustrated in FIG. 2, and implements a command process, representatively illustrated by a command processor 210. The command processor 210 may be comprised of a pulse scaling processor 220 and a real-time processor 230. The exemplary real-time processor 230 produces command updates at every control loop processing cycle. The exemplary pulse scaling processor 220 performs preparatory calculations related to planning the next slew trajectory and determines the pulse amplitude for the next slew command. This processing may be performed as a background task on the same processing hardware as the real-time processor 230.

Exemplary SPS command processor 210 may be communicatively coupled to a storage unit 250, such as digital memory. Storage unit 250 may include a code segment 252, in which processing instructions are stored that, when executed by SPS command processor 210, perform the operations to implement the processes described herein. Storage unit 250 may also include a data segment 254, in which, among other things, system variables, lookup tables and implementation-specific constants may be stored and retrieved.

SPS command generator 110 may be implemented in hardware, such as by an application-specific integrated circuit (ASIC), a field programmable gate array (FPGA), or by a combination of hardware and software, such as by a general purpose microprocessor or a digital signal processor executing suitably programmed processing instructions. Further, whereas SPS command generator 110 is illustrated in FIG. 2 as comprising separate processor units, such is for description only. Numerous processor architectures may be used in conjunction with the present invention without departing from the spirit and intended scope thereof, as will be readily recognized by those skilled in the system control arts.

SPS command generator 110 may further be communicatively coupled to a clock circuit, representatively illustrated by clock 260, to generate various timing signals, e.g., processor clock signal, update timers and sampling signals. Whereas, clock 260 is illustrated in FIG. 2 as being coupled to only SPS command generator 110, it is to be understood that the timing signals generated thereby may be suitably distributed throughout servo-system 100 despite the sparseness of explicit illustration thereof.

Exemplary command processor 210 assigns values to the command signals in successive update intervals, such as provided by clock circuit 260, to form a slew command. The values assigned to the acceleration, velocity, and position signals, $\alpha$, $\omega$, and $\theta$ respectively, are provided to exemplary feedforward controller 130, which estimates, from knowledge of the actuator device 150 and plant 160, the torque required to position plant 160 to the commanded position, and indicates the torque requirement through a feedforward command signal 132. The values assigned to the position variable $\theta$ are provided to feedback controller 120, which estimates the torque requirements based on the difference between the commanded slew and the actual slew progress, as determined from velocity and position feedback signals 172 provided by sensors 170. Feedforward command signal 132 is combined with feedback command signal 122 to form control signal 142 which is processed by the D/A and power amplifier 140 to drive the actuator 150.

Exemplary feedback controller 120 implements a suitable feedback control architecture, such as proportional, integral, derivative (PID) control, or general purpose controller elements, such as cascaded biquadratic filter sections or state space controllers. Similarly, the feedforward controller may take on various implementations, such as velocity and acceleration feedforward gains or other, more complex and general filter architectures. However, it is to be emphasized that the feedback and feedforward control architectures illustrated and described herein are not essential to implementing the present invention.

Figure 3A:
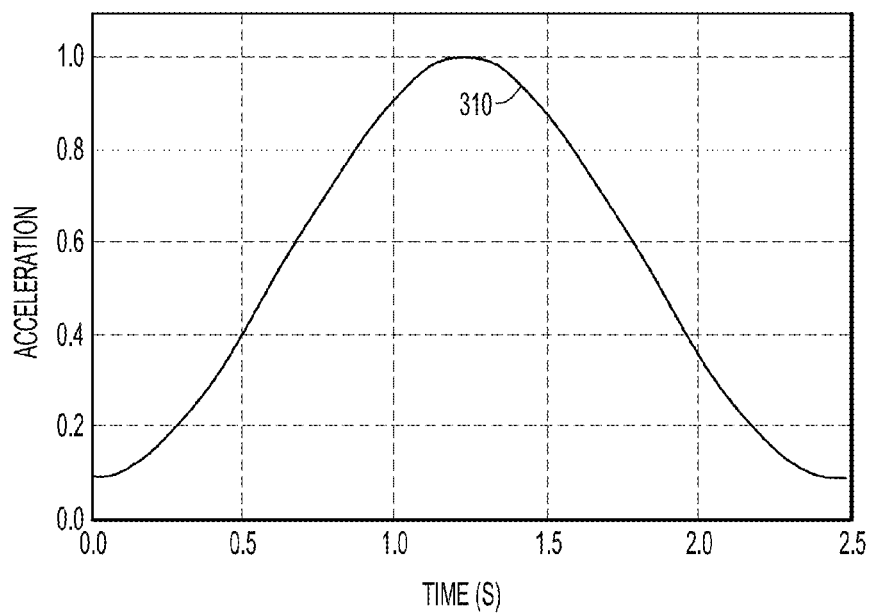
FIGS. 3A-3B are graphical representations of an exemplary prototype pulse and its frequency spectrum, respectively, that may be realized through embodiments of the present general inventive concept.
Figure 3B:
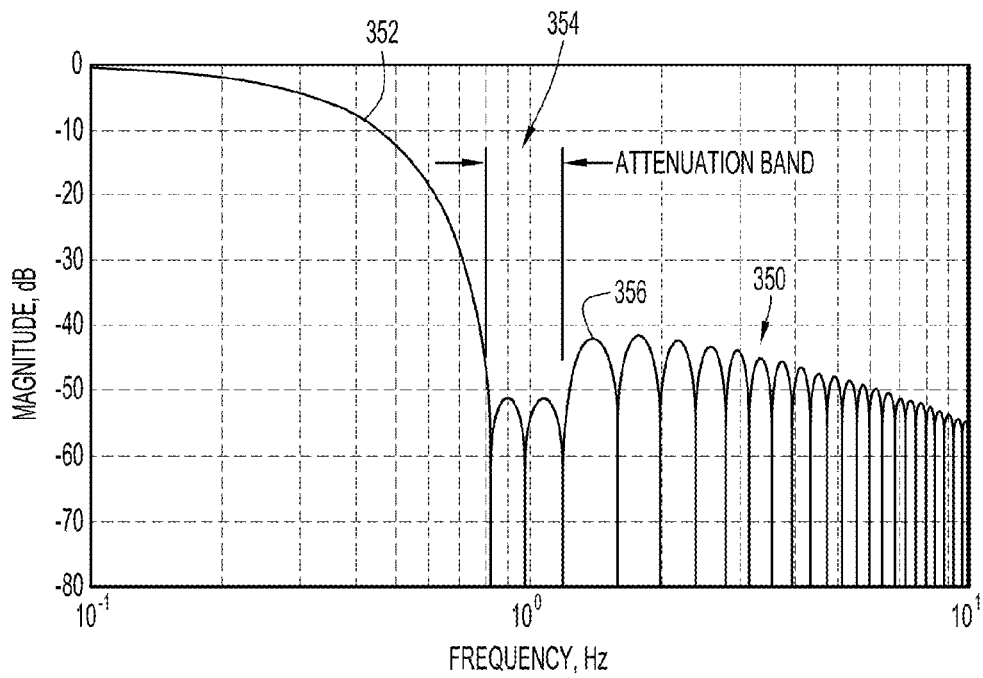

An exemplary SPS acceleration pulse 310 is shown in FIG. 3A, normalized to unit amplitude, the frequency spectrum of which is illustrated in FIG. 3B. The normalized acceleration pulse is referred to herein as a prototype acceleration pulse 310 or, alternatively, as an SPS pulse 310. An SPS pulse can be independently scaled in amplitude and shifted in time to achieve a desired slew while controlling the frequency spectrum of such slew in accordance with the present invention. The pulse shape determines the spectral content of the pulse signal and provides a foundation for the slew command formulations. The term pulse shape, as used herein, refers to the collection of points that comprise a unit amplitude SPS pulse signal profile of arbitrary width.

SPS pulse 310 is characterized further by its prototypical pulse width $T_p$, which can be scaled to align the frequency content of the pulse, such as an attenuation band described below, to a frequency band of interest in the system response spectrum, such as a frequency band encompassing a system's resonant frequency. Once set, however, $T_p$ remains constant for any and all slews in systems with stationary dynamics, as will be described in detail below.

FIG. 3B illustrates the frequency spectrum 350 of SPS pulse 310. Frequency spectrum 350 may be characterized by the spectral energy contained in its main or primary lobe 352, by the spectral energy contained in its sidelobes, representatively illustrated by sidelobe 356, and the spectral energy, or more aptly, the reduction in spectral energy contained in an attenuation band 354. As used herein, the term attenuation band refers to a band of frequencies in the frequency spectrum of a control signal, such as SPS pulse 310, the peak spectral content of which is reduced in the spectral region of interest and reduced thereat beyond the spectral peak for any of the frequency bands adjacent thereto. The placement and spectral content of attenuation band 354 is established from a combination of prototypical pulse width $T_p$ and the pulse shape.

Figure 4A:
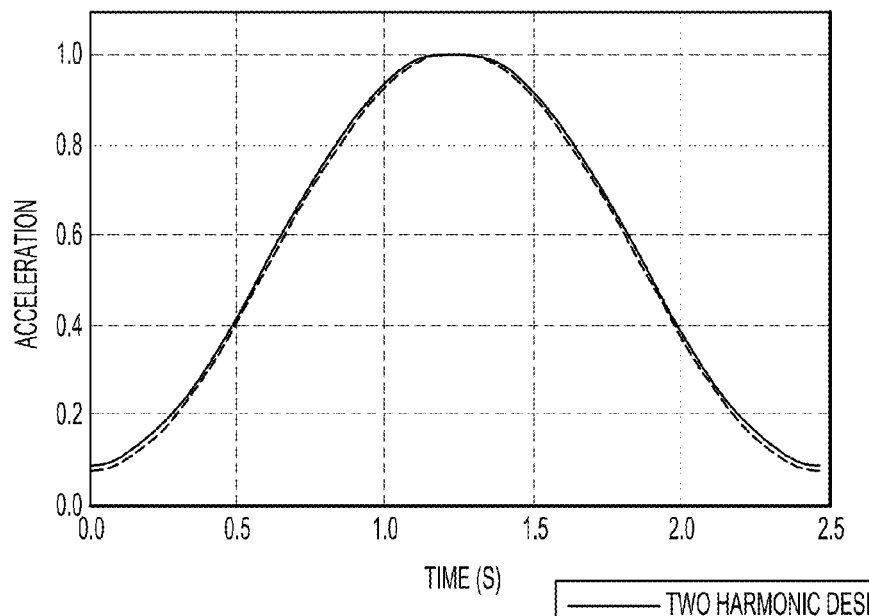
FIGS. 4A-4B are graphical representations of the exemplary prototype pulse depicted in FIGS. 3A-3B as compared with a higher order realization thereof.
Figure 4B:
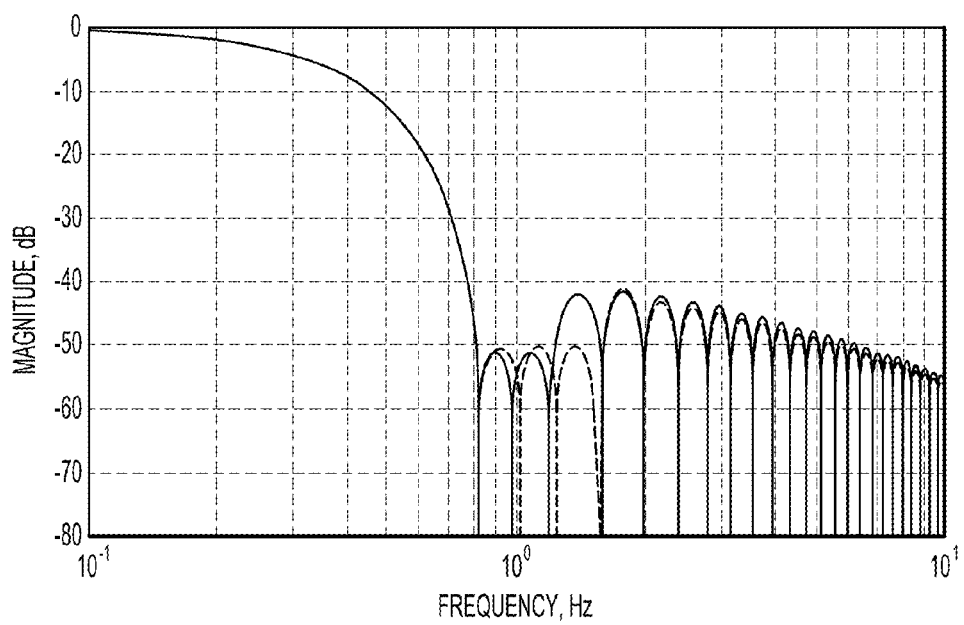

SPS pulse 310 may be defined by a product of a window function and a finite term cosine series, $$\rho(t) = w(t) \sum_{k=0}^{N_s} a_k \cos\left(2\pi k \frac{t}{T_p}\right), 0 \leq t \leq T_p, \tag{1}$$

where $w(t)$ is the window function, $T_p$ is the pulse width, $(N_s+1)$ is the number of terms in the cosine series and $a_k$ are the series coefficients. In certain design processes associated with embodying the present invention, the window function $w(t)$, number of harmonic series components $N_s$ and the amplitudes of these components are suitably selected to achieve a desired frequency spectrum. As an example, SPS pulse 310 illustrated in FIG. 3A is formulated with three terms ($N_s=2$) and a unity window function ($w(t)=1$). The harmonic coefficients for this particular design are $a_0=0.542468$, $a_1=-0.455712$ and $a_2=0.001820$. The order of the harmonic series and the harmonic coefficients can be prudently chosen or computed to achieve a desired width of the attenuation band, while maintaining the energy content in the main spectral lobe. For example, with $N_s=4$, harmonic components $a_0=0.542468$, $a_1=-0.457429$, $a_2=0.002552$, $a_3=-0.002866$ and $a_4=0.002605$ and unity window function $w(t)$, minute but salient differences in the prototype pulse shape are realized, as illustrated in FIG. 4A, but a significantly broader attenuation band is realized in the spectrum, as illustrated in FIG. 4B. It is to be understood that the curve separation in FIG. 4A is for illustration purposes so that the pulse shapes can be discerned. In practice, both acceleration pulses illustrated in FIG. 4A have unity amplitude. It is to be understood further that for purposes of description only, the SPS pulse amplitudes will all be normalized to unity although the present invention can be embodied by numerous scaling techniques without departing from the spirit and intended scope thereof.

In the example of FIGS. 3A-3B, the shape of SPS pulse 310 has been optimized to attenuate the first two spectral side lodes between 0.8 Hz and 1.2 Hz. That is, SPS pulse 310 is shaped to concentrate most of the slew energy in main lobe 352 between DC and 0.8 Hz while significantly diminishing energy content in attenuation band 354 between 0.8 Hz and 1.2 Hz. Accordingly, SPS pulse 310 may be applied in a system with a lightly damped resonance near 1 Hz (on a normalized scale) without significantly exciting this vibrational mode. Due to the width of the attenuation band, a slew based on SPS pulse 310 is robust to nearly ±20% uncertainty in the vibrational mode frequency. The four harmonic SPS pulse illustrated in FIG. 4A, the spectrum of which is illustrated in FIG. 4B provides, an attenuation band that spans 0.8 Hz to 1.6 Hz, i.e., twice the attenuation bandwidth of the two harmonic SPS pulse design.

Optimal pulse shapes may be determined through numerical optimization techniques by which the coefficients in Eqn. 1 obtain a desirable pulse frequency spectrum. Numerous numeric techniques can be used in conjunction with the present invention without departing from the spirit and intended scope thereof. For purposes of demonstration and not limitation, the Nelder-Mead optimization algorithm was used to generate the pulse shape coefficients presented in this disclosure. The optimization objective function computed a cost based on the peak pulse spectrum magnitude within the attenuation band and the peak spectrum magnitude for frequencies higher than the attenuation band. The pulse width and number of coefficients was held constant during the optimization process. The spectra in this disclosure are all computed via the Fast Fourier Transform (FFT) from uniform samples of the SPS pulse (Eqn. 1) with a 10 ms time increment and subsequently zero-padded to a length of $2^{20}$ samples. SPS pulse 310 can be easily modified to accommodate systems with modes other than at 1 Hz owing to the inverse scaling of the frequency spectrum with a scaling of the pulse width. This directly follows from the scaling property of the Fourier Transform for a signal ρ(t) with transform ρ(f)

$$a\rho(at) \overset{\mathcal{F}}{\leftrightarrow} \rho(f/a). \quad (2)$$

For example, if the prototype acceleration pulse 310 is uniformly compressed in time so that the width is half as wide (a=2 in Eqn. 2), frequency spectrum 350 will be uniformly expanded so that all spectral features occur at twice the original frequency, i.e., the attenuation band will lie between 1.6 and 2.4 Hz. In this manner, the prototype SPS pulse width can be scaled to place the attenuation band appropriately for any resonance that is to be avoided. Accordingly, the pulse width, and therefore the speed with which a slew motion can be completed without exciting a system resonance, is dependent on the frequency of the mode. This basic fact is true for all slew algorithms. The SPS slew technique affords a narrow acceleration pulse width with controlled frequency response, whereby the speed with which the slew can be executed can be increased without exciting a specific resonance.

Figure 5A:
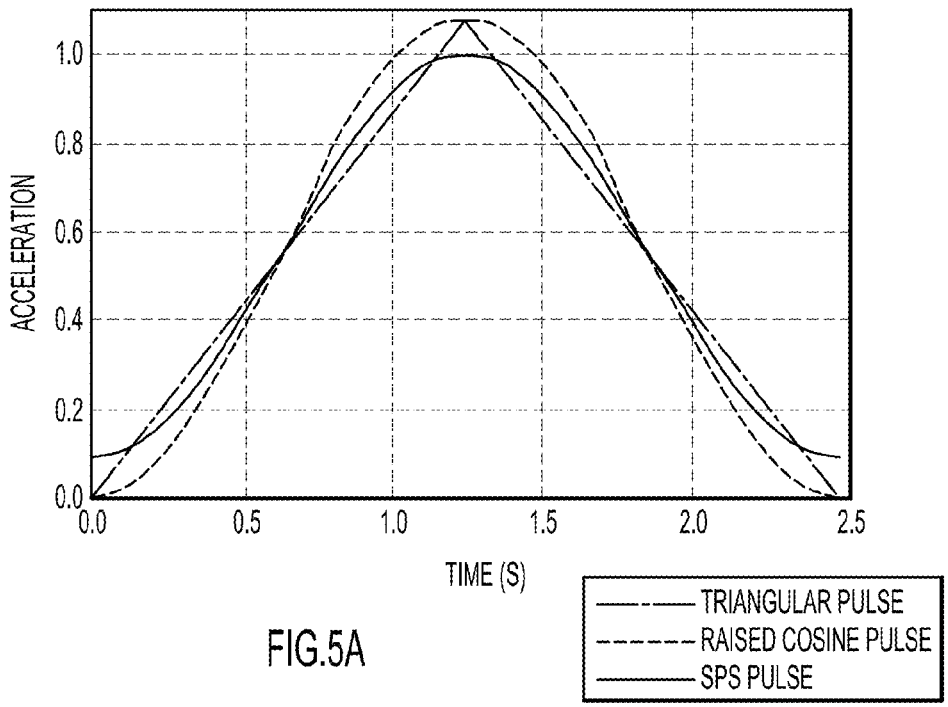
FIGS. 5A-5B are graphical representations of the exemplary prototype pulse depicted in FIGS. 3A-3B as compared with conventional acceleration pulse profiles scaled to equivalent area with the prototype pulse.

Benefits of the SPS motion commanding techniques described herein will now be presented by way of comparison with other methodologies. One of the most common conventional motion control techniques is based on a constant jerk formulation, which manifests itself in a triangular acceleration pulse. Another common acceleration pulse is that having a raised cosine or haversine pulse shape, which can be expressed by Equation 1 using two terms ($a_0$=0.5, $a_1$=-0.5), but would not be considered an SPS pulse. These two acceleration pulses and the SPS pulse are compared in FIG. 5A. It is to be noted that the widths of the pulses illustrated in FIG. 5A are equivalent and that the amplitudes are all scaled to achieve equal area. Accordingly, each acceleration pulse is capable of achieving the same change in velocity.

Figure 5B:
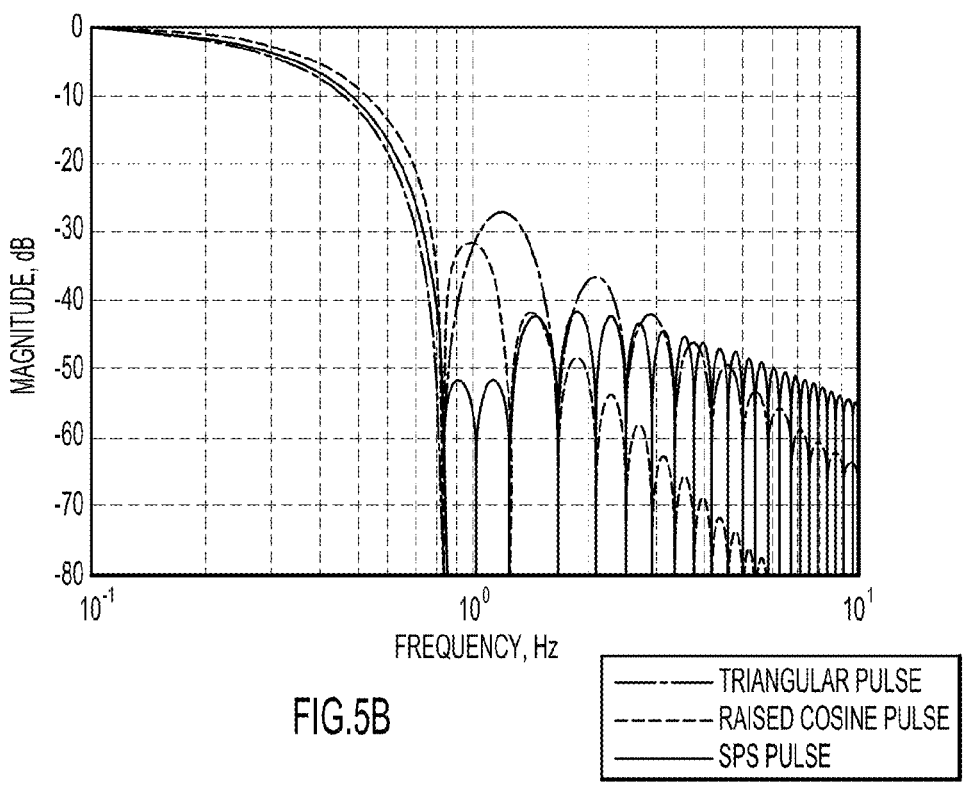
Figure 6A:
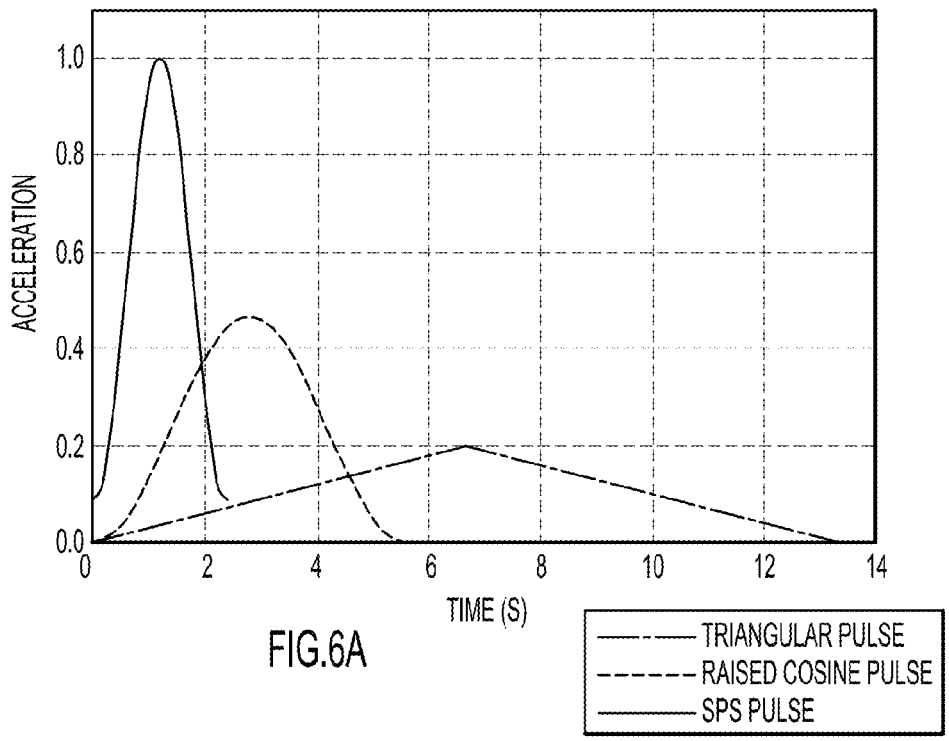
FIGS. 6A-6B are graphical representations of the exemplary prototype pulse depicted in FIGS. 3A-3B as compared with the conventional acceleration pulse profiles that have been scaled in amplitude to obtain equivalent area with the prototype pulse and temporally expanded to achieve equivalent peak spectral content within the desired attenuation band.
Figure 6B:
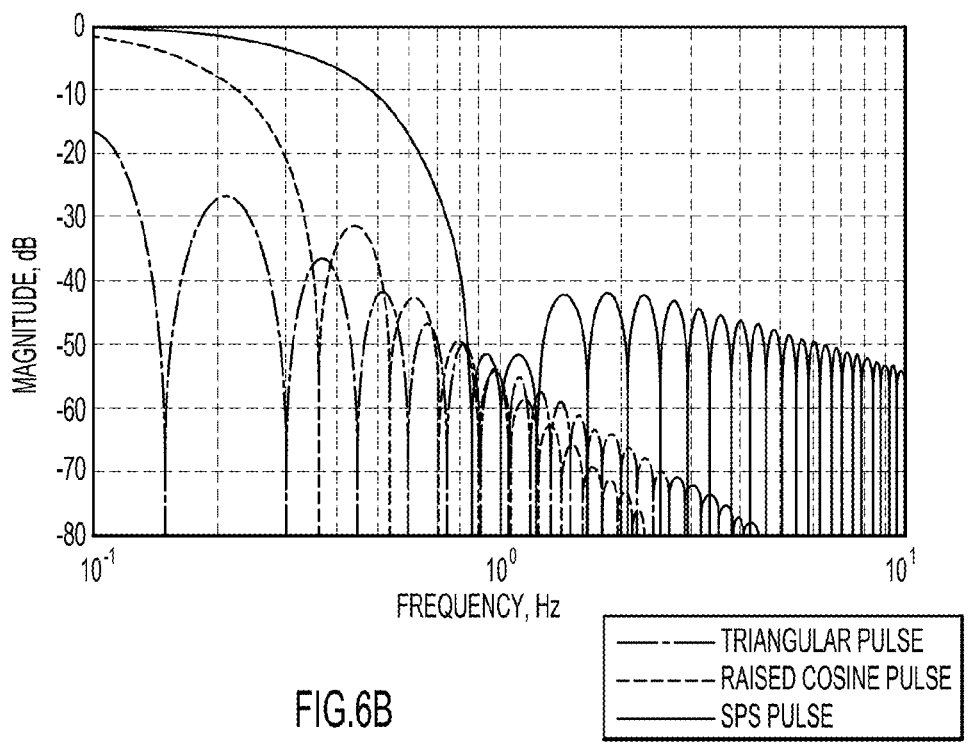

It is evident from the spectra of the three pulses, illustrated in FIG. 5B, that the SPS pulse spectrum has an order of magnitude less peak energy than the raised cosine pulse in the critical frequency band between 0.8 Hz and 1.2 Hz. Compared to the triangular pulse shape, the SPS pulse spectrum has a peak spectral component that is sixteen times smaller in the same critical band. Accordingly, motion commanded by the SPS pulse can make a ten times greater velocity change than a motion command based on the raised cosine pulse or 16 times greater velocity change than a motion command based on a triangular pulse without imparting any greater peak energy in the critical band. Alternatively, the raised cosine and triangular pulses would have to be 2.2 times and 5.4 times wider, respectively, to achieve the same level of peak spectral content in the attenuation band for a given change in velocity, as illustrated in FIGS. 6A-6B. The equal area pulses in FIG. 6A have the same peak level of spectral content between 0.8 Hz and 1.2 Hz as illustrated in FIG. 6B. All three pulses are capable of achieving the same change in velocity, but the raised cosine pulse and the triangular pulse will require substantially more time to avoid imparting greater energy than the SPS pulse within the attenuation band. It is to be noted that higher peak acceleration is achieved by the SPS pulse. Alternative acceleration profiles may not realize the full capacity of the actuator without inducing an unwanted vibrational response while the SPS based slew can utilize greater actuator effort during a movement.

Figure 7A:
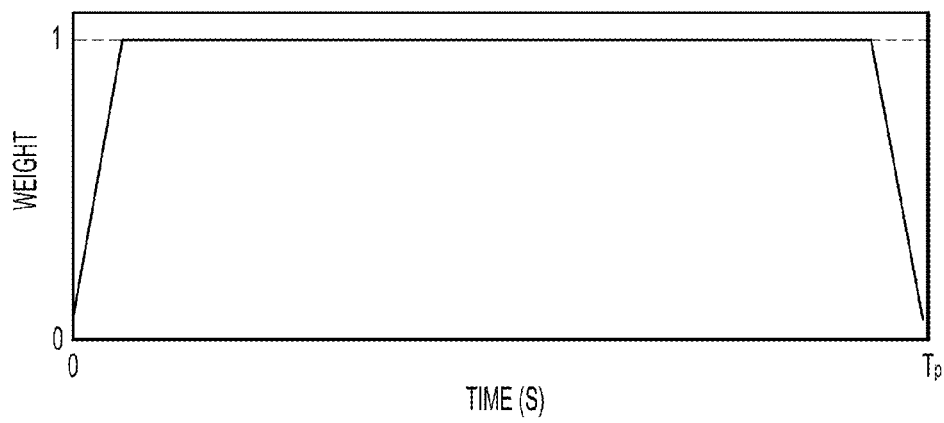
FIGS. 7A-7C are graphical representations of exemplary effects of windowing the exemplary prototype pulse depicted in FIGS. 3A-3B.
Figure 7B:
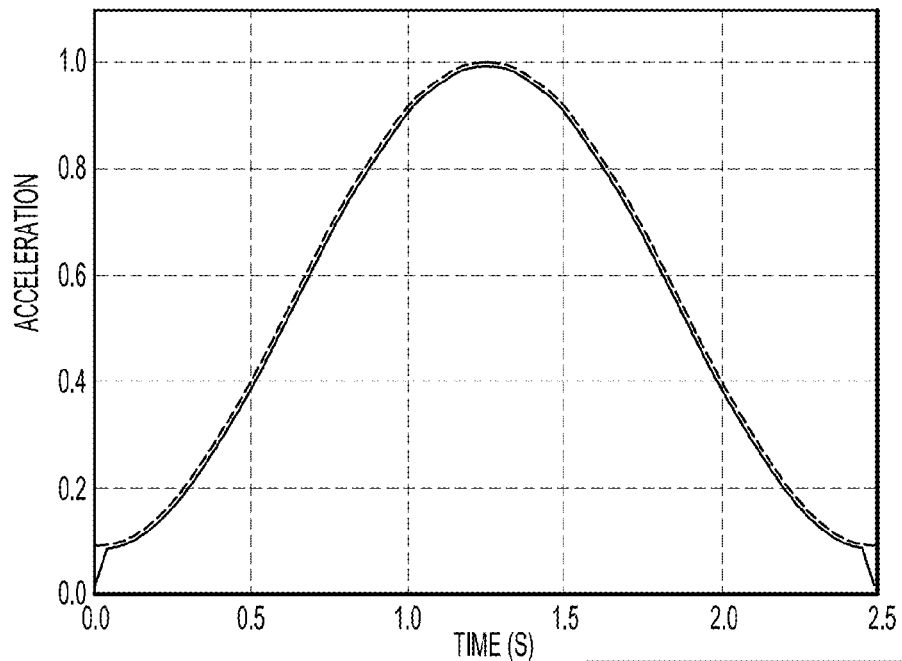
Figure 7C:
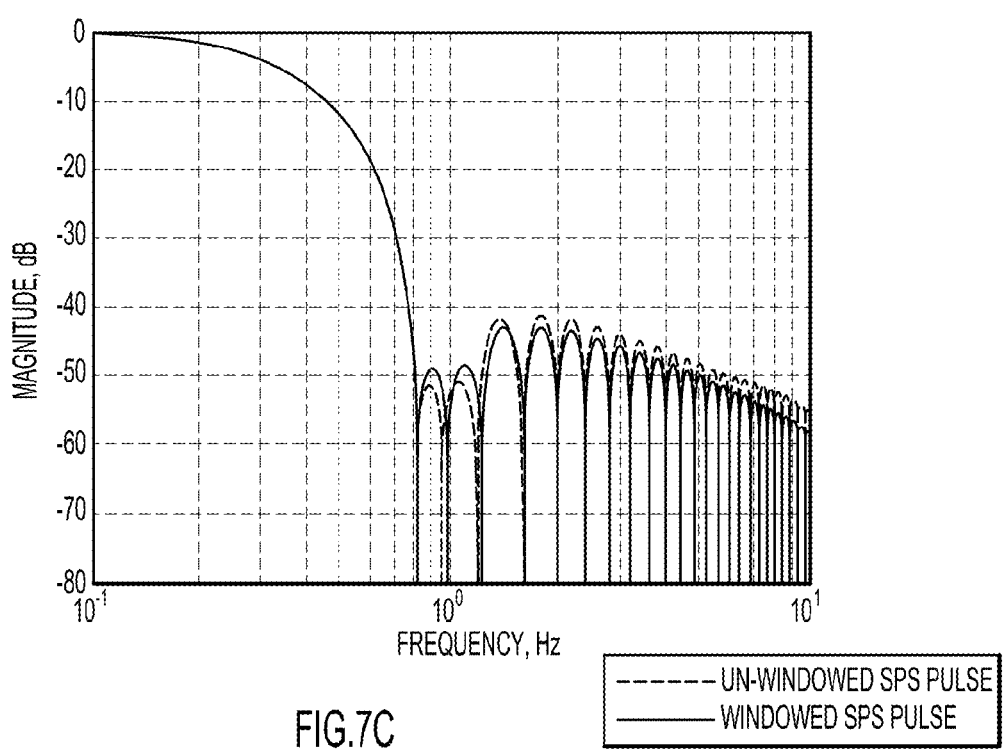

In certain applications, the actuators used may be sensitive to the commanded jerk, and it is thus undesirable to have abrupt pulse discontinuities at the ends of the pulse. For these systems, the window function w(t) may be suitably constructed to soften abrupt acceleration changes, i.e., limit the jerk, without unduly impacting the spectral content of the pulse. An example of a jerk limiting window function for an acceleration pulse width of $T_p$ is illustrated in 7A. A comparison of SPS pulse 310, with and without the jerk limiting window, is illustrated in FIG. 7B. The effect of the window function is evident at the ends of the windowed acceleration pulse. In general, the use of a window function will slightly increase the peak response in the attenuation band, but such may be necessary to satisfy hardware constraints. To minimize this degradation in performance, the harmonic coefficients $a_k$ in Eq. (1) can be modified to optimize the spectral content of the windowed pulse, the result of such is illustrated in FIG. 7C. A numerical optimization identical to the method described previously was used with the addition of a constant, jerk-limiting window function.

Figure 8A:
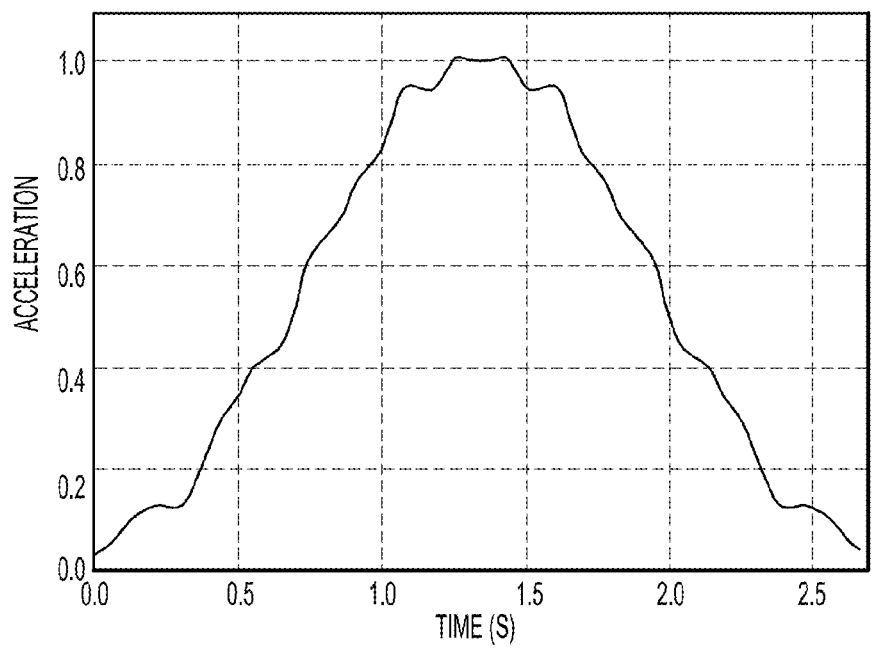
FIGS. 8A-8B are graphical representations of an exemplary prototype pulse defining multiple attenuation bands realized through embodiment of the present general inventive concept.
Figure 8B:
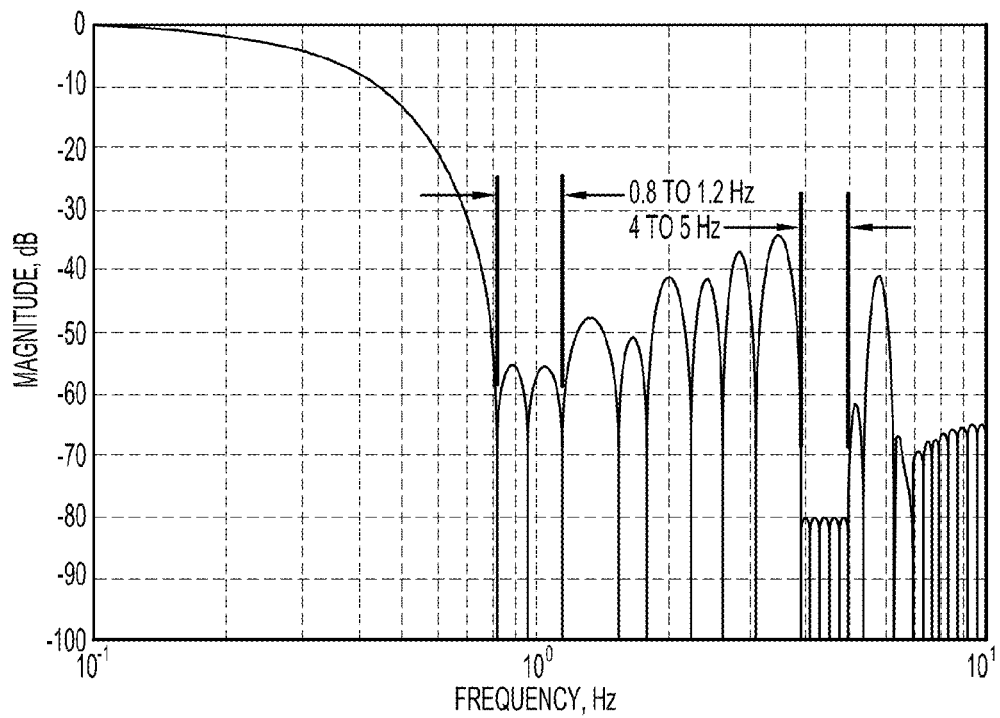

For systems with complex dynamics, the present invention may be embodied with optimized pulse shapes that are ideally suited for a specific application. For example, a pulse shape for realizing two attenuation bands is illustrated in FIG. 8A and the corresponding spectrum is illustrated in FIG. 8B. The coefficients for this pulse are given by $[a_0, a_1, \ldots, a_{16}]$= [0.521016, -0.474338, 0.012677, -0.001226, -0.001579, 0.004691, -0.000525, -0.001626, -0.013032, -0.018704, 0.004138, -0.000246, -0.000287, -0.000138, 0.000787, 0.005590, -0.009192].

A complete SPS slew command is formed from two acceleration pulses, scaled and separated to satisfy arbitrary position and velocity boundary conditions for the beginning and end of the slew. Both acceleration pulses have the same shape and duration, as set by the shape and duration of the SPS pulse from which they are derived, but are scaled to different amplitudes. As illustrated in an example slew shown in FIG. 9A, a first acceleration pulse 910 is applied at the onset of the slew, t=0, and a second acceleration pulse 920 is applied to terminate the slew ending at t=8 s=$T_{slew}$. FIG. 9D illustrates the acceleration frequency spectrum of the exemplary slew depicted in FIG. 9A. This spectrum illustrates that the separation of the pulses need not be tuned to the oscillation period of the dominant vibration mode; the SPS pulse shape alone controls the acceleration spectrum. In particular, the combination of two separated acceleration pulses that both have low spectral content in the same frequency band will result in an acceleration command that retains low spectral content in the same frequency band. This means the two SPS acceleration pulses may be arbitrarily separated to satisfy desired movement durations and boundary conditions. In general, acceleration pulses 910, 920 will be scaled independently from one another to satisfy arbitrary initial and terminal position and velocity conditions for the slew. The pulse width $T_p$ may remain constant through the amplitude scaling and is thus the same for both pulses 910, 920.

The amplitude p of the first pulse 910 applied at the onset of the slew may be calculated from the slew duration and boundary conditions using, $$p = \frac{\Delta\theta - \Delta\omega\frac{c_d}{c_v} - \omega_i T_{slew}}{c_v(T_{slew} - T_p)}, \quad (3)$$

where, $\Delta\theta = \theta_f - \theta_i$ is the commanded change in angular displacement over the duration of the slew, $\theta_f$ being the final position and $\theta_i$ being the initial position, $\Delta\omega = \omega_f - \omega_i$ is the commanded change in angular velocity during the slew, $\omega_f$ being the final angular velocity and $\omega_i$ being the initial velocity, $T_{slew}$ is the slew duration, $T_p$ is the pulse width, $c_v$ is the change in angular velocity in response to the prototype acceleration pulse, and $c_d$ is the change in angular position in response to the prototype acceleration pulse evaluated at time $T_p$ after the start of the pulse and with zero initial velocity. The pulse velocity constant $c_v$ may be determined from, $$c_v = \int_0^{T_p} \rho(t)\,dt, \quad (4)$$

and the pulse displacement constant $c_d$ may be given by, $$c_d = \int_0^{T_p}\int_0^{\tau} \rho(t)\,dt\,d\tau, \quad (5)$$

where $\rho(t)$ is the prototype pulse. The amplitude q of the second pulse at the end of the slew may be given by, $$q = \frac{\Delta\omega}{c_v} - p. \quad (6)$$

Using these scaling factors, the SPS pulse may be scaled to form a complete slew acceleration command. The velocity and position commands, respectively illustrated in FIGS. 9B and 9C, may be computed by symbolic or numerical integration of the acceleration command.

In certain applications, such as speed control, it may only be necessary to alter the commanded velocity without regard for the positional change that occurs during the acceleration period. In this case, only a single acceleration pulse is required and the amplitude may be computed from $$p = \frac{\Delta\omega}{c_v}. \quad (7)$$

Figure 9A:
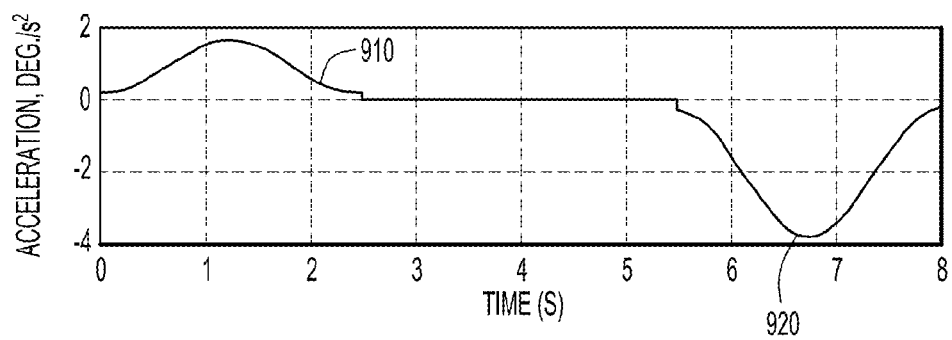
FIGS. 9A-9C are graphical representations of an exemplary motion control signal derived from a prototype pulse realized through embodiment of the present general inventive concept.
Figure 9B:
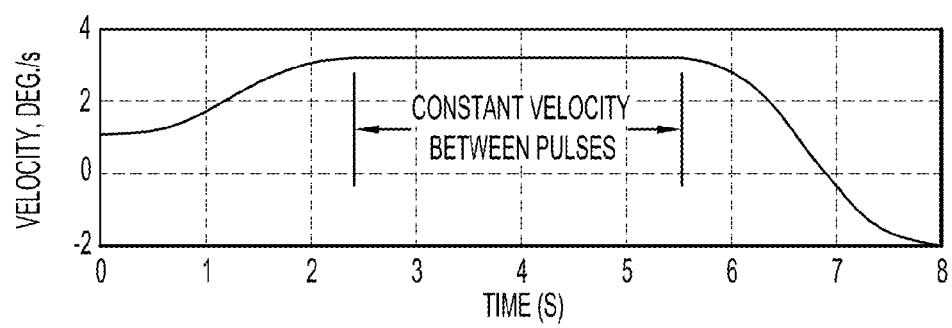
Figure 9C:
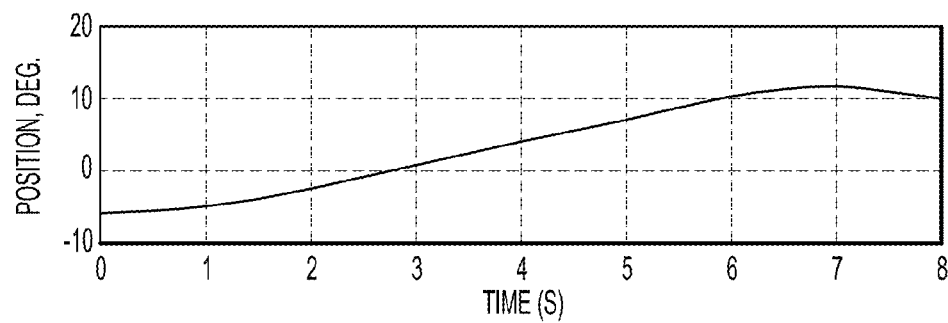
Figure 9D:
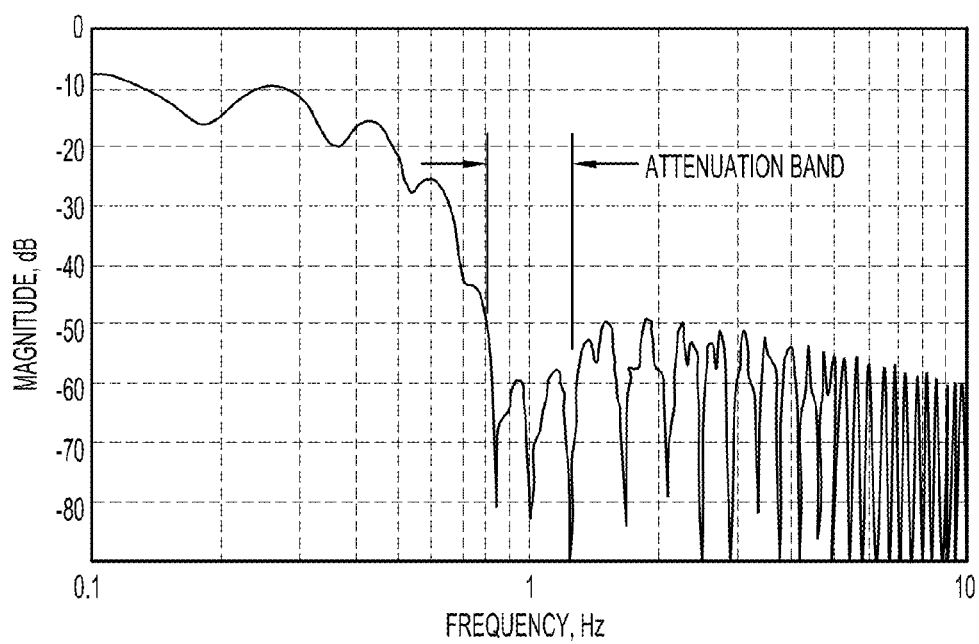
FIG. 9D is a graphical representation of the frequency spectrum of the exemplary motion control signal depicted in FIGS. 9A-9C.

The exemplary slew command of FIGS. 9A-9C is of a slew duration in which the two acceleration pulses are completely separated in time. The inventive technique described herein is not so limited and allows slew commands to be constructed where the two pulses overlap in time. In the region where the pulses overlap, the acceleration is the sum of the two shifted pulse signals. Despite this overlap, the spectrum of the acceleration signal for the overlapped pulse slew retains low energy in the attenuation band. Empirically, it has been found that pulse overlap can exceed 95% while still maintaining effective attenuation in the critical bandwidth. Accordingly, the minimum SPS slew duration may be only a few percent longer than the acceleration pulse width.

In certain embodiments, the SPS slew process described herein is implemented through digital processing that operates on uniformly, sampled data. The discrete-time implementation of such an embodiment may form a prototype pulse uniformly sampled from Eqn. 1 with a sampling period of $T_s$.

$$\rho(n) = w(n)\sum_{k=0}^{N_s} a_k \cos\left(2\pi k \frac{n}{N_p - 1}\right), \quad 0 \le n \le N_p - 1. \quad (8)$$

where $N_p$ is the number of samples over the pulse width ($N_p = T_p/T_s$). The number of pulse samples may establish the optimum values for the pulse coefficients ($a_k$), especially with respect to the depth of the attenuation band. The pulses illustrated in this disclosure assume the time increment for computed pulse samples to be $T_s = 10$ ms, which equates to 250 samples for the pulse width shown in FIG. 3A ($T_p = 2.5$ s).

In certain embodiments, the pulse scaling processor 220 in FIG. 2 may perform background tasks in preparation for the next slew, such as fetching slew parameters and performing preparatory calculations for the next slew. Basic slew parameters might include slew start time ($t_i$), slew end time ($t_f$), and boundary conditions such as initial slew velocity ($\omega_i$), final slew velocity ($\omega_f$), initial slew position ($\theta_i$), and final slew position ($\theta_f$). The pulse scaling processor 220 may also calculate the pulse amplitudes (p and q) for the next slew using Eqns. 3 and 6. The parameters and pulse amplitude computed by the pulse scaling processor 220 may then be made available to the real-time processor 230 at the start of the next slew. In certain embodiments, the real-time processor 230 is tasked with generating the slew commands for every servo cycle and certain embodiments of the present invention minimize the computational load on this processor.

Figure 10:
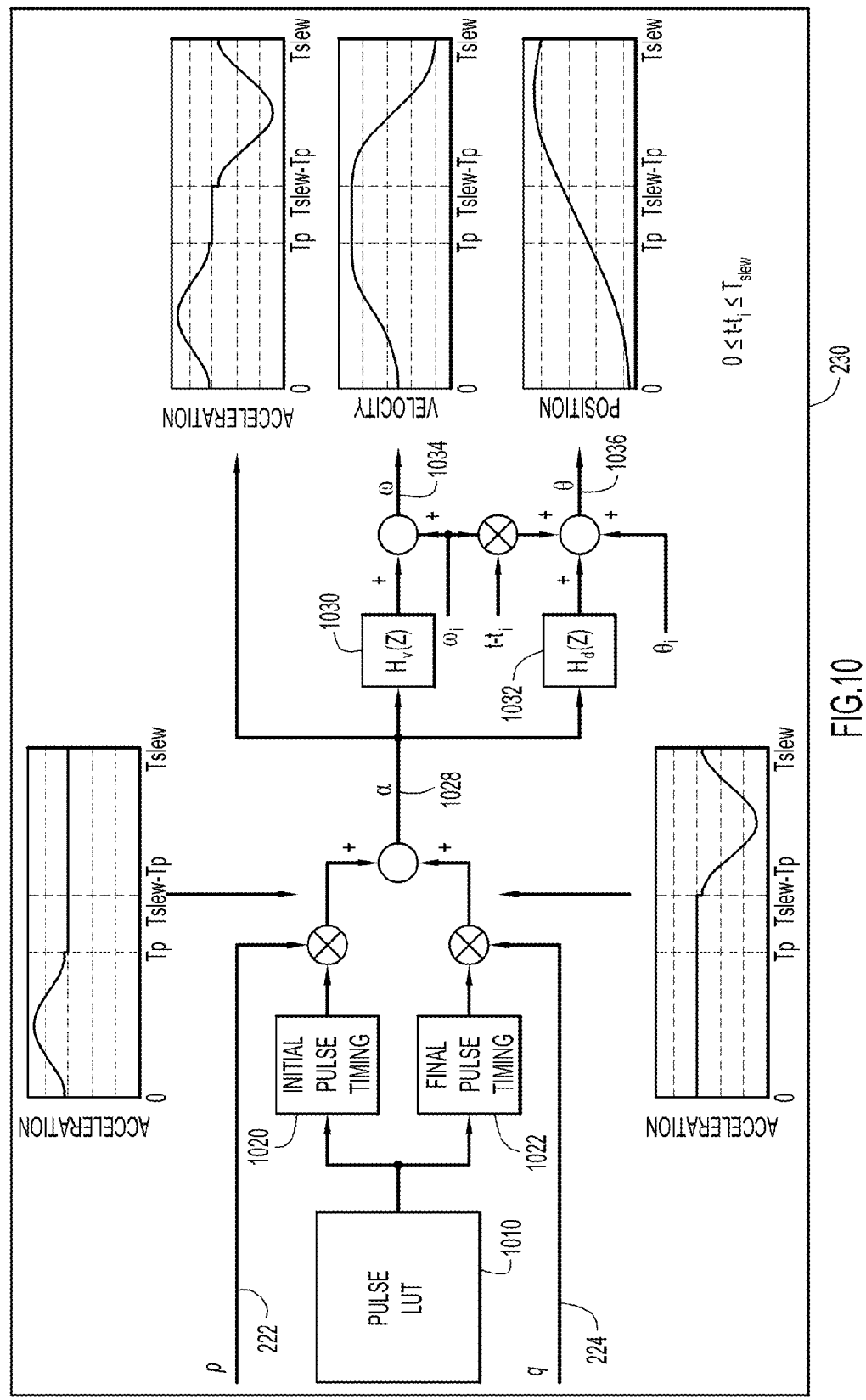
FIG. 10 is a schematic block diagram of an exemplary real-time processor architecture by which the present general inventive concept can be embodied.

FIG. 10 illustrates exemplary signal processing operations that may be performed within the exemplary real-time processor 230 to generate slew commands within the exemplary SPS command generator 110 illustrated in FIGS. 1-2. The real-time processor 230 may be coupled to storage unit 250, an exemplary portion of which is illustrated as storage unit 1010 in FIG. 10. Storage unit 1010 has stored therein a look-up table (LUT) that contains pre-computed samples of a normalized SPS pulse evaluated from Eqn. 8. The normalized pulse samples can be evaluated offline at the same rate as the servo loop closing rate and need not be updated for fixed plant 160 dynamics. Such a priori computation and storage is a result of the pulse width, $T_p$, remaining constant for all slews generated for a time invariant plant. The samples from the LUT are read out of memory at the appropriate times to form the normalized initial and final acceleration pulse signals as indicated by blocks 1020 and 1022 respectively. The two normalized pulse signals are then multiplied by the appropriate scaling gains, p and q, and combined to form the SPS slew acceleration signal 1028. The acceleration signal 1028 is filtered through the integration filter $H_v(z)$ and combined with the initial velocity $\omega_i$ to form the slew velocity signal $\omega$ 1034. Similarly, the acceleration signal is also filtered through the double integration filter $H_d(z)$ and combined with the initial position $\theta_i$ and the propagated initial velocity to form the slew position signal $\theta$ 1036. The use of a static LUT of pulse samples and digital integration filters maintains the real-time processing demand at a minimal and constant level despite the complexity of the pulse shape and regardless of whether the number of series terms, $N_s$, in Eqn. 8 is large. The exemplary signal processing shown in FIG. 10 is one of many possible implementation approaches that may be selected and is not intended to preclude alternative implementations of the algorithms described in this document.

The slew acceleration command component $\alpha(n)$ may be integrated to derive the velocity and position command components $\omega(n)$ and $\theta(n)$ therefrom. There are many integration schemes that could be employed to determine the velocity and position commands from the acceleration signal. For a plant that is driven by a zero-order hold actuator, the integrations may be performed in real-time using discrete-time filters 1030, 1032. The velocity command component $\omega(n)$ can be obtained by filtering the acceleration command $\alpha(n)$ using the discrete-time filter depicted in 1030 and defined below in Eq. (9).

$$H_v(z) = \frac{\omega(z)}{\alpha(z)} = T_s \frac{z^{-1}}{1-z^{-1}}, \tag{9}$$

where $T_s$ is the discrete time sample period. Similarly, the position command $\theta(n)$ can be generated from the acceleration command $\alpha(n)$ through filter 1032, which is defined by Eq. (10):

$$H_d(z) = \frac{\theta(z)}{\alpha(z)} = \frac{T_s^2}{2} \frac{z^{-1}+z^{-2}}{1-2z^{-1}+z^{-2}}. \tag{10}$$

For nonzero initial conditions, the commanded velocity, $\omega(n)$, and position, $\theta(n)$ are given by, respectively, $$\omega(n)=\omega_i+\omega'(n), \tag{11}$$

$$\theta(n)=\theta_i+(n-n_i)\omega_i T_s+\theta'(n), \tag{12}$$

where $n_i$ is the sample index at the start of the slew command and $\omega'(n)$ and $\theta'(n)$ are the angular velocity and angular position samples, respectively, obtained from the filters 1030 and 1032.

Due to the zero-order hold assumption implicit in the derivation of Eqn. 9, the final velocity will not be reached until one sample after the final nonzero pulse sample. In certain embodiments, the normalized pulse samples are defined to include an extra padded zero at the end of the pulse.

$$\rho_p(n) = \begin{cases} \rho(n) & 0 \le n \le N_p - 1 \\ 0, & n = N_p \end{cases}. \tag{13}$$

The padded pulse length will then be $$N_{pp}=N_p+1. \tag{14}$$

The pulse velocity constant, $c_v$, can be evaluated from $$c_v=\omega_p(N_p), \tag{15}$$

where $\omega_p(n)$ is the result of filtering the zero padded, normalized acceleration pulse, $\rho_p(n)$, by $H_v(z)$. Similarly, the pulse displacement constant, $c_d$, can be evaluated from $$c_d=\theta_p(N_p), \tag{16}$$

where $\theta_p(n)$ is the result of filtering the zero padded, normalized acceleration pulse, $\rho_p(n)$, by $H_d(z)$.

The slew command illustrated in 9A-9C is an example of a slew command generated by the technique described herein, where the following boundary conditions are met: initial position=−6°, initial velocity=1 degree/second, final position=10°, final velocity=−2 degrees/second.

Possible applications for the SPS slew technique encompass an extensive field of high performance motion control. For example, imaging systems often require rapid retargeting to acquire multiple images in a short time frame. Examples of such include satellite systems, aerial imaging systems, lidar systems, health imaging systems, motion control stages for microscopy and semiconductor wafer fabrication, etc.

Computer Numerical Control (CNC) for machine tools also requires fast motion control algorithms that do not excite structural resonances within the machine. One specific application is milling of lightweight aluminum aerospace structures in which greater than 90% of stock material is removed in so-called pocketing operations. The pockets produced are usually rectangular, typically have dimensions of a few inches or less and require frequent acceleration of the machine along its axes to create the pocket.

Pick-and-place assembly equipment and other assembly robotics are often driven to the dynamic limits of the machinery in order to reduce cycle time. Data storage devices, including hard disk, magneto-optical, and optical drives, require fast motion of spindles, write/read/erase heads, and focus and tracking actuators. These applications may benefit from the present inventive concept to minimize the excitation of structural resonances within the device.

Consumer and commercial printing technologies require fast motion control of both the drum and print heads. These applications may benefit from the slew control described herein as well.

Although the foregoing description of the SPS slew technique has been directed towards motion commands for mechanical systems with vibrational resonances, it may well have application in other fields where the resonant response is of a different nature. For example, communication systems that have transmission line effects may benefit from a signaling approach that specifically avoids exciting an electrical resonance in the communication path. The technique disclosed herein may also be applied to flow control systems where the pulse is generated by fluid proceeding through a valve.

The technique may also be easily extended to adaptive tracking of changing system dynamics, either through continuous system state identification or a gain-scheduling approach, where tables of varied pulse shapes are stored for use in different conditions. Robotic applications may benefit from such a gain-scheduling approach to contend with position-dependent structural dynamics. In particular, a long slew on a multilink robotic arm may require different pulse shapes at both ends of the slew to accommodate the different dynamics that exist between the starting and ending configurations.

Figure 11:
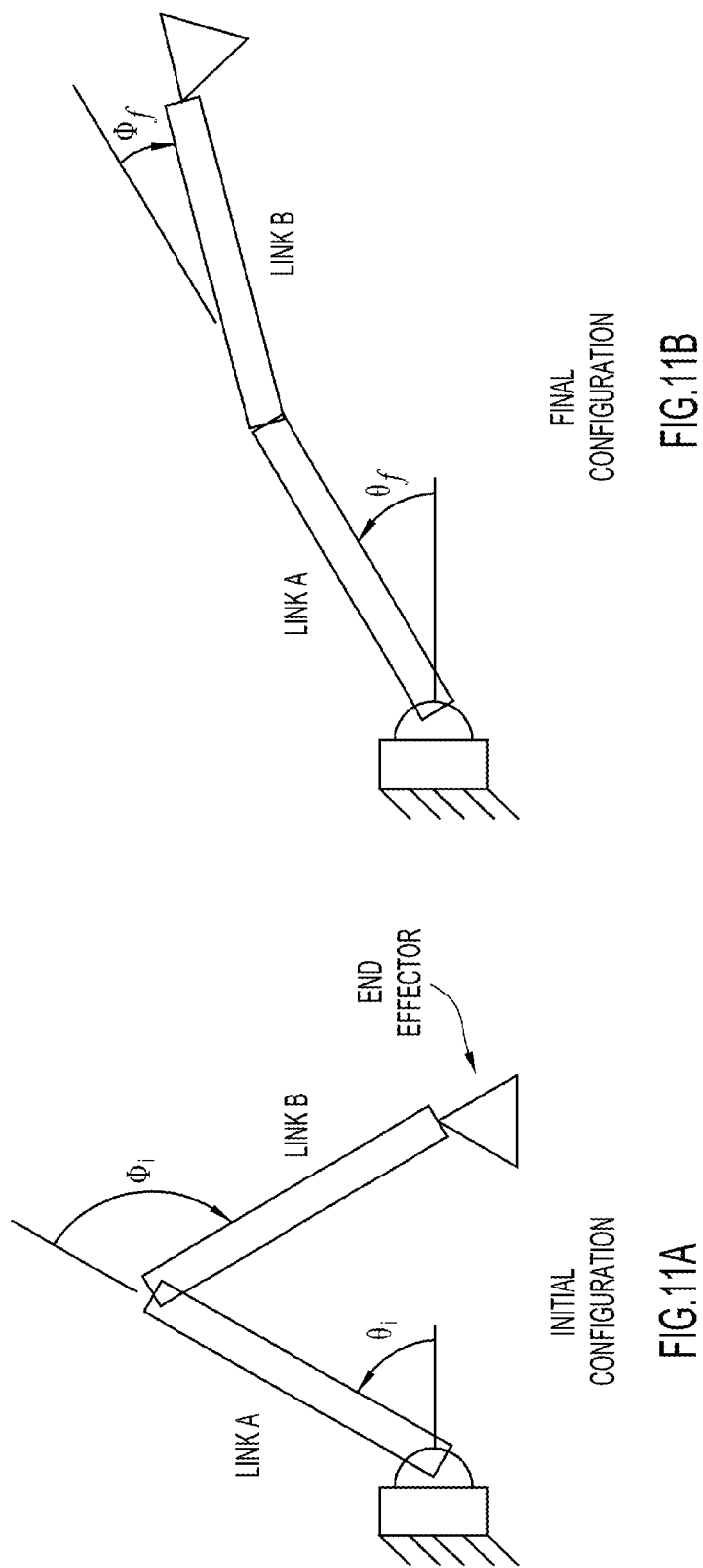
FIGS. 11A-11B is a graphical representation of a multi-link robotic arm in which the present general inventive concept can be embodied.
Figure 12:
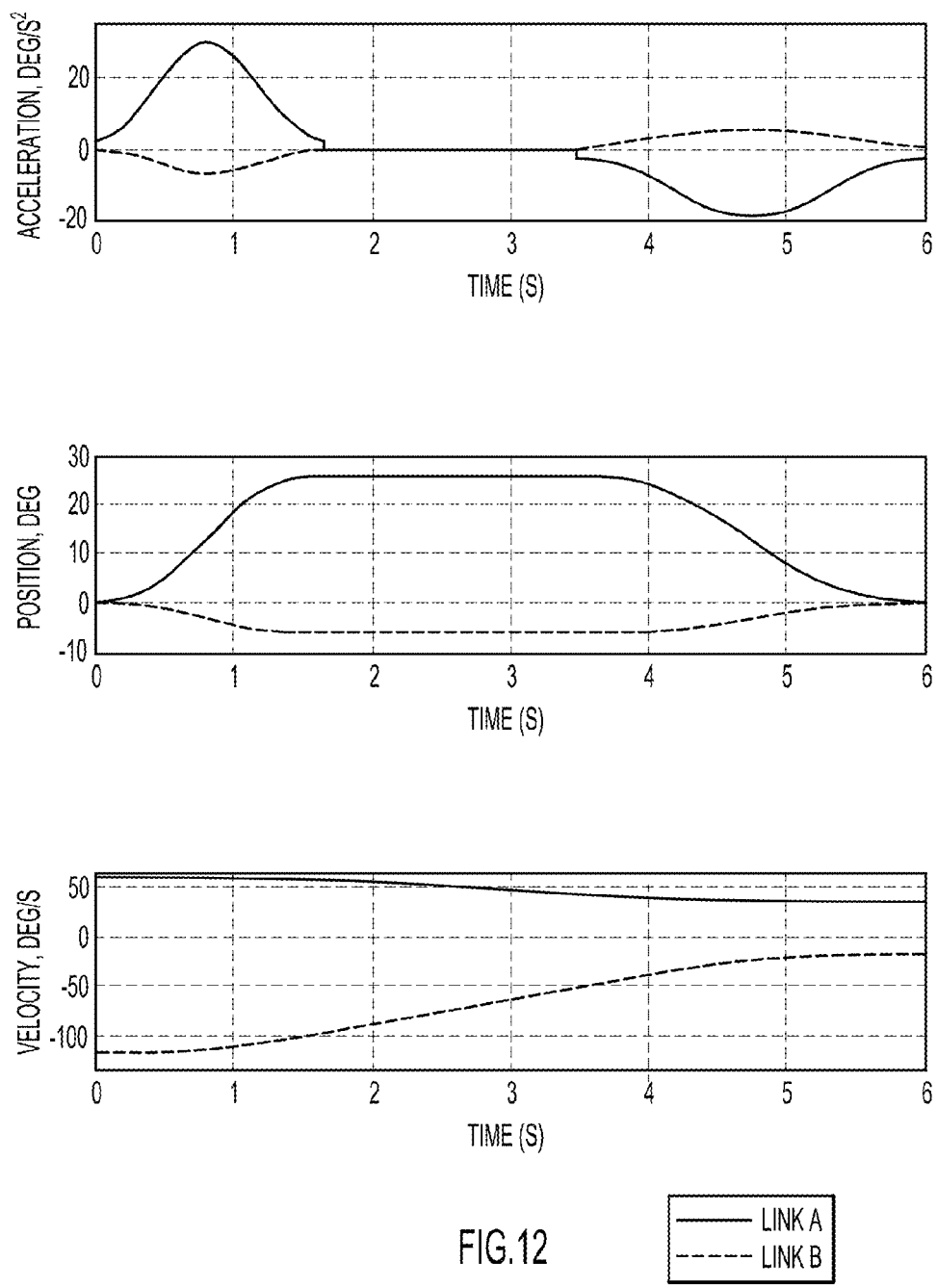
FIG. 12 is a set of graphs representing the command for the robot motion described with reference to FIGS. 11A-11B.

A two link robotic arm is illustrated in FIG. 11A in an initial configuration. The robot link angles $\theta_i$ and $\phi_i$ may be controlled by rotational servomotors to position the end effector at a desired location. Due to flexibilities in the robotic links and attachment structure, structural resonances can be expected in the frequency response between the commanded acceleration to the servomotors and the location of the end effector. Ending the motion in the final robot configuration shown in FIG. 11B will result in a different frequency response between the servomotor commanded acceleration and the location of the end effector. Most notably, the dominant structural resonance may have a lower natural frequency. For purposes of demonstration, it is to be assumed that the dominant resonance in the initial configuration is 2 Hz and, in the final configuration, the dominant resonance has dropped to 1 Hz, Accordingly, slew profiles are to be established on respective axes to move from $\theta_i$=60 deg, $\phi_i$=−120 deg to $\theta_f$=35 deg, $\phi_f$=−20 deg in $T_{slew}$=6 s and all velocities at the beginning and end of the arm motion are to be zero. The four harmonic SPS pulse design shown in FIG. 4A and FIG. 4B may be used for these slews, whereby the wide attenuation band will avoid exciting the resonance as it shifts in frequency during the periods over which the acceleration pulses are applied. The slew commands for both links are shown in FIG. 12. The acceleration command of the illustrated initial pulse is 1.65 s wide so that the attenuation band spans the 1.2 Hz to 2.4 Hz range, thereby avoiding the shifting resonance that exists during the first acceleration pulse. The final pulse width is 2.5 s which places the attenuation band between 0.8 Hz and 1.6 Hz to avoid exciting the shifting resonance condition that exists during the final acceleration pulse.

When the two pulse widths are different, the formulas for calculating the pulse amplitudes are modified to, $$p = \frac{\Delta\theta - \Delta\omega \frac{c_{df}}{c_{vf}} - \omega_i T_{slew}}{c_{vi}(T_{slew} - T_p) + c_{di} - \frac{c_{vi}}{c_{vf}} c_{df}}, \quad (17)$$

where $c_{vi}$ and $c_{di}$ are the velocity and position pulse constants, respectively, for the initial, normalized pulse and $c_{vf}$ and $c_{df}$ are similarly evaluated for the final, normalized pulse. The terminal pulse width may be determined from, $$q = \frac{\Delta\omega - pc_{vi}}{c_{vf}}, \quad (18)$$

Implementation of the SPS slew technique with different pulse designs at the beginning and end of the slew may be achieved through mechanisms similar to the constant pulse design architecture previously presented with reference to the SPS command generator in FIG. 2 and the real-time processor in FIG. 10. The pulse scaling processor 220 may be modified to incorporate the updated pulse amplitude calculations based on Eqns. 17 and 18. The real-time processor architecture 230 illustrated in FIG. 10 may be modified to accommodate the pulse LUT 1010 storing multiple SPS pulse LUTs associated with time varying dynamics of the plant. For example, in the case of the two link robot, the link angles $\theta$ and $\phi$ would be used to select the correct pulse LUT for resonance conditions that exist during the beginning of the slew and to select a different pulse LUT for use near the end of the slew.

Having described preferred embodiments of new and improved motion control techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus to control a transient response of a mechanical system to a motion command signal, the apparatus comprising:
   a command generator to:
   receive data defining an initial state and a final state in the mechanical system and a time interval within which a change of state from the initial state to the final state is to complete; and
   generate a command profile from one or more copies of a previously specified prototype pulse, each copy of the prototype pulse being independently scaled in amplitude by a scaling factor computed from the initial and final states in the mechanical system, the prototype pulse having a prototypical pulse width and a prototypical pulse shape that define at least one attenuation band in a frequency spectrum thereof so as to inhibit an undesired frequency-dependent response in the mechanical system to acceleration of at least one component thereof that effects the change of state in the mechanical system within the time interval; and
   a controller to generate the motion control signal from the command profile in response to which the component effects the change of state in the mechanical system within the time interval.

2. The apparatus of claim 1, wherein the command generator generates the command profile from a single amplitude-scaled copy of the prototype pulse responsive to the received data indicating that at least one of the initial and final states of the mechanical system corresponds with zero acceleration.

3. The apparatus of claim 1, wherein the pulse width of all of the amplitude-scaled copies of the prototype pulse from which the command profile is constructed is constant and fixed to that of the prototypical pulse width.

4. The apparatus of claim 1, wherein the command generator:
   scales one copy of the prototype pulse by a first scaling factor computed from the initial and final states and the time interval to generate an onset pulse of the command profile; and
   scales another copy of the prototype pulse by second scaling factor computed from the initial and final states and the first scaling factor to generate a terminal pulse of the command profile.

5. The apparatus of claim 3, wherein the prototypical pulse shape is defined by a sum of scaled trigonometric terms that establishes the attenuation band.

6. The apparatus of claim 5 further comprising:
a storage unit to store therein numerical samples of the prototype pulse; and
a command processor to retrieve the samples from the storage unit for each copy of the prototype pulse and to scale the samples by the corresponding scaling factor to generate the command profile.

7. The apparatus of claim 6, wherein the numerical samples are multiplied by a jerk-limiting window function in addition to being scaled by the corresponding scaling factors.

8. The apparatus of claim 4, wherein the pulse width of the onset pulse and that of the terminal pulse are equivalent one to the other and fixed to the prototypical pulse width.

9. The apparatus of claim 4, wherein the ratio of the time interval over which the change of state is to be completed to the prototypical pulse width is minimally bounded at no greater than 1.05.

10. The apparatus of claim 8, wherein the pulse shape of the onset pulse and that of the terminal pulse are equivalent one to the other and to a sum of scaled trigonometric terms defining the prototypical pulse shape.

11. The apparatus of claim 8 further comprising:
an actuator in the mechanical system to drive the component through a trajectory responsive to the motion command signal, the initial state of the mechanical system defining an initial position and velocity of the component on the trajectory and the final state defining a final position and velocity of the component on the trajectory.

12. The apparatus of claim 10 further comprising:
a storage unit to store therein numerical samples of the prototype pulse; and
a scaling processor to retrieve the samples from the storage unit for both the copy and the other copy of the prototype pulse and to respectively scale the samples of each of the copy and the other copy of the prototype pulse by the first and second scaling factors to generate the onset pulse and the terminal pulse, respectively, of the command profile.

13. The apparatus of claim 11 further comprising:
a storage unit to store therein numerical samples of the prototype pulse;
a pulse scaling processor to scale the samples from the storage unit by the first and second scaling factors to generate the onset pulse and the terminal pulse, respectively; and
a real-time processor to generate actuator positions from the command profile in which the onset pulse and the terminal pulse are spaced apart by a temporal interval.

14. The apparatus of claim 11 further comprising:
at least one other actuator in the mechanical system to drive the component through another trajectory responsive to another motion command signal, and wherein the command generator generates the command profile from the copies of the prototype pulse and from one or more copies of another prototype pulse, each of the copies of the prototype pulse and the other prototype pulse being scaled in amplitude by corresponding scaling factors computed from the initial and final states of the mechanical system, the other prototype pulse having another prototypical pulse width and another prototypical pulse shape that define the at least one attenuation band in a frequency spectrum thereof so as to inhibit the undesired frequency-dependent response in the mechanical system to a change in the acceleration of the component along the trajectory and the other trajectory.

15. The apparatus of claim 13, wherein the pulse scaling processor computes the first scaling factor from the initial and final positions of the trajectory, the initial and final velocities of the trajectory and the time interval over which the component traverses the trajectory.

16. The apparatus of claim 13, wherein the real-time processor includes:
an integrator to generate the actuator positions from the command profile established as defining an acceleration profile on the trajectory.

17. A method of controlling a transient response of a mechanical system to a motion command signal, the method comprising:
generating data by which a prototype pulse is attributed a prototypical pulse width and a prototypical pulse shape that define an attenuation band in a frequency spectrum of the prototype pulse;
generating a command profile from one or more copies of the prototype pulse, each copy of the prototype pulse being independently scaled in amplitude by a scaling factor computed from initial and final states in the mechanical system, the attenuation band being established so as to inhibit an undesired frequency-dependent response in the mechanical system to acceleration of at least one component thereof that effects a change of state in the mechanical system from the initial state to the final state; and
generating the motion command signal from the command profile by which the component effects the change in state of the mechanical system within a selected time interval.

18. The method of claim 17, wherein generating the command includes:
scaling the amplitude of a single copy of the prototype pulse in response to at least one of the initial and final states of the mechanical system corresponding to a zero value of the acceleration, the pulse width of the scaled copy of the prototype pulse remaining constant and equivalent to that of the prototypical pulse width.

19. The method of claim 17, wherein generating the data includes:
summing scaled trigonometric terms to harmonically define the prototypical pulse shape and the attenuation band.

20. The method of claim 18, wherein generating the command includes:
scaling one copy of the prototype pulse by a first scaling factor computed from the initial and final states and the time interval to generate an onset pulse of the command profile; and
scaling another copy of the prototype pulse by a second scaling factor computed from the initial and final states and the first scaling factor to generate a terminal pulse of the command profile such that the pulse width of the onset pulse and that of the terminal pulse are equivalent one to the other and fixed to the prototypical pulse width and the pulse shape of the onset pulse is equivalent to that of the terminal pulse and to the prototypical pulse shape.

21. The method of claim 20 further comprising:
providing the motion command signal to an actuator in the mechanical system in response to which the actuator imparts a force on the component sufficient to compel the component along a trajectory by which the change of state of the mechanical system is carried out, the initial state defining an initial position of the component on the trajectory and the final state defining a final position of the component on the trajectory.

22. The method of claim 21, wherein scaling the copy of the prototype pulse for the onset pulse includes:

computing the scaling factor from the initial and final positions of the component on the trajectory, initial and final velocities of the component on the trajectory and a temporal duration over which the component traverses the trajectory.

23. The method of claim 19, wherein generating the data includes:

multiplying the sum of the scaled trigonometric terms by a jerk-limiting window function.

24. The method of claim 23, wherein generating the command profile includes:

minimally-bounding the ratio of the duration of the time interval over which the change of state is to be completed to the prototypical pulse width at no greater than 1.05.

25. A non-transitory computer readable medium encoded with software comprising processor-executable instructions that, when executed by a processor, cause the processor to:

generate data by which a prototype pulse is attributed a prototypical pulse width and a prototypical pulse shape that define an attenuation band in a frequency spectrum of the prototype pulse;

generate a command profile from one or more copies of the prototype pulse, each copy of the prototype pulse being independently scaled in amplitude by a scaling factor computed from initial and final states in the mechanical system, the attenuation band being established so as to inhibit an undesired frequency-dependent response in the mechanical system to acceleration of at least one component thereof that effects the change of state therein; and generate a motion command signal from the command profile by which the component effects the change in state of the mechanical system within a selected time interval.

* * * * *

UNITED STATES PATENT AND TRADEMARK OFFICE
CERTIFICATE OF CORRECTION

| | | |
|---|---|---|
| PATENT NO. | : 8,803,465 B1 | Page 1 of 2 |
| APPLICATION NO. | : 13/441450 | |
| DATED | : August 12, 2014 | |
| INVENTOR(S) | : Smith et al. | |

It is certified that error appears in the above-identified patent and that said Letters Patent is hereby corrected as shown below:

In the drawings:

Please replace Fig. 12 with Fig. 12 as shown on the attached page.

Signed and Sealed this
Sixth Day of January, 2015

Michelle K. Lee
*Deputy Director of the United States Patent and Trademark Office*

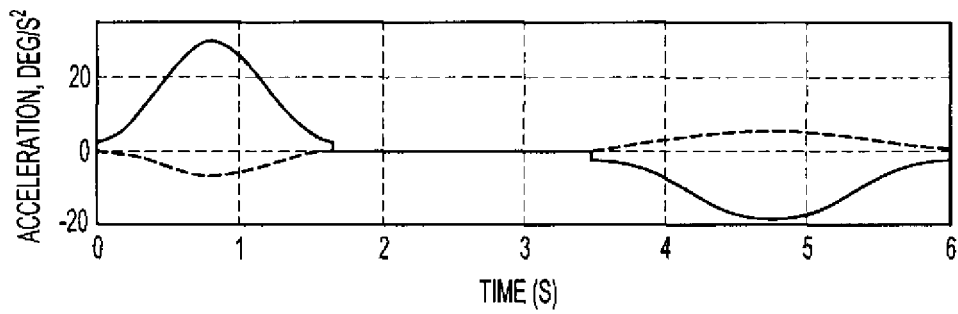
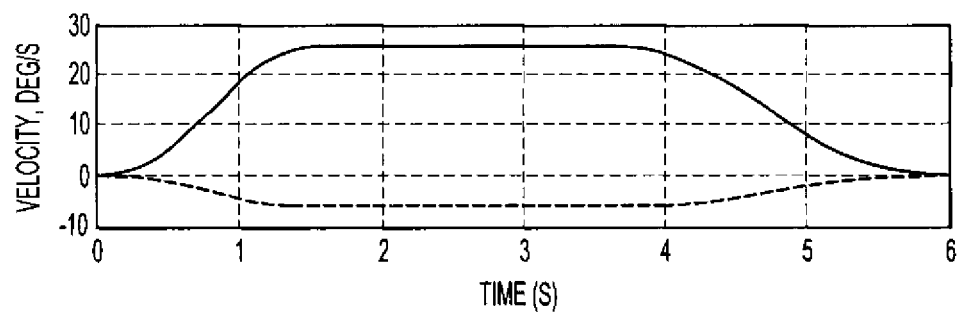
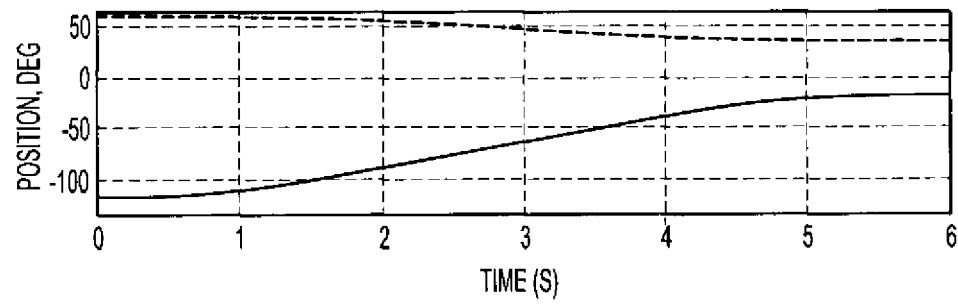
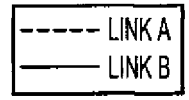
FIG.12